United States Patent
Veiseh

(10) Patent No.: US 10,919,684 B2
(45) Date of Patent: Feb. 16, 2021

(54) LOW COST INSULATED CARRYING BAG

(71) Applicant: SIMPLE CONTAINER SOLUTIONS, INC., Rancho Dominguez, CA (US)

(72) Inventor: Charles S. Veiseh, Los Angeles, CA (US)

(73) Assignee: SIMPLE CONTAINER SOLUTIONS, INC., Rancho Dominguez, CA (US)

( * ) Notice: Subject to any disclaimer, the term of this patent is extended or adjusted under 35 U.S.C. 154(b) by 23 days.

(21) Appl. No.: 16/056,801

(22) Filed: Aug. 7, 2018

(65) Prior Publication Data
US 2019/0047774 A1  Feb. 14, 2019

Related U.S. Application Data

(60) Provisional application No. 62/542,652, filed on Aug. 8, 2017.

(51) Int. Cl.
*B65D 81/38* (2006.01)
*B65D 33/18* (2006.01)
(Continued)

(52) U.S. Cl.
CPC ............ *B65D 81/3897* (2013.01); *B32B 5/18* (2013.01); *B32B 27/065* (2013.01); *B32B 27/08* (2013.01);
(Continued)

(58) Field of Classification Search
CPC .... B65D 81/3897; B65D 31/02; B65D 31/08; B65D 33/02; B65D 33/08; B65D 33/18;
(Continued)

(56) References Cited

U.S. PATENT DOCUMENTS 4,211,267 A * 7/1980 Skovgaard ............. B65D 33/00
229/69
2003/0031388 A1* 2/2003 Gipson ................... B32B 5/022
383/64
(Continued)

FOREIGN PATENT DOCUMENTS

| CN | 106061853 A | * | 10/2016 | ......... B65D 33/2508 |
| EP | 174159 A2 | * | 3/1986 | |
| EP | 308063 A2 | * | 3/1989 | |

OTHER PUBLICATIONS

Machine translation of CN-106061853-A.*

*Primary Examiner* — Jes F Pascua
(74) *Attorney, Agent, or Firm* — Dilworth IP LLC

(57) ABSTRACT

An insulated carrying bag comprising:
  a. a multilayer first panel comprising a top free edge, a bottom edge, a first side edge a second side edge, a strengthened section comprising strengthening material, and a holding aperture positioned in the strengthened section;
  b. a multilayer second panel comprising a top free edge, a bottom edge, a first side edge and a second side edge, a strengthened section comprising strengthening material, and a holding aperture positioned in the strengthened section; and
  c. a multilayer bottom panel comprising a front edge and a back edge,
    the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges, (Continued)

wherein the connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material.

19 Claims, 8 Drawing Sheets

(51) Int. Cl.
| | |
|---|---|
| *B65D 33/25* | (2006.01) |
| *B32B 5/18* | (2006.01) |
| *B32B 27/06* | (2006.01) |
| *B32B 27/08* | (2006.01) |
| *B32B 27/30* | (2006.01) |
| *B32B 27/32* | (2006.01) |
| *B32B 27/34* | (2006.01) |
| *B65D 33/08* | (2006.01) |
| *B65D 30/08* | (2006.01) |
| *B65D 33/20* | (2006.01) |
| *B65D 30/18* | (2006.01) |
| *B65D 33/02* | (2006.01) |

(52) U.S. Cl.
CPC ............ *B32B 27/306* (2013.01); *B32B 27/32* (2013.01); *B32B 27/34* (2013.01); *B65D 31/02* (2013.01); *B65D 31/08* (2013.01); *B65D 33/02* (2013.01); *B65D 33/08* (2013.01); *B65D 33/18* (2013.01); *B65D 33/20* (2013.01); *B65D 33/2508* (2013.01); *B65D 33/2591* (2013.01); *B32B 2250/24* (2013.01); *B32B 2266/025* (2013.01); *B32B 2307/304* (2013.01); *B32B 2307/558* (2013.01); *B32B 2307/7242* (2013.01); *B32B 2439/06* (2013.01); *B32B 2553/026* (2013.01)

(58) Field of Classification Search
CPC ................ B65D 33/20; B65D 33/2508; B65D 33/2591; B32B 5/18; B32B 27/065; B32B 27/08; B32B 27/306; B32B 27/32; B32B 27/34; B32B 2250/24; B32B 2266/025; B32B 2307/304; B32B 2307/558; B32B 2307/7242; B32B 2439/06; B32B 2553/026
USPC .................. 383/5, 10, 17, 20, 100–103, 110
See application file for complete search history.

(56) References Cited

U.S. PATENT DOCUMENTS

| | | | |
|---|---|---|---|
| 2004/0120611 A1* | 6/2004 | Kannankeril | B65D 31/10 383/110 |
| 2005/0019511 A1* | 1/2005 | Piemonte | B32B 3/02 428/34.1 |
| 2008/0310776 A1* | 12/2008 | Turvey | B65D 33/01 383/105 |
| 2010/0281831 A1* | 11/2010 | Kannankeril | B65B 31/046 53/432 |

* cited by examiner

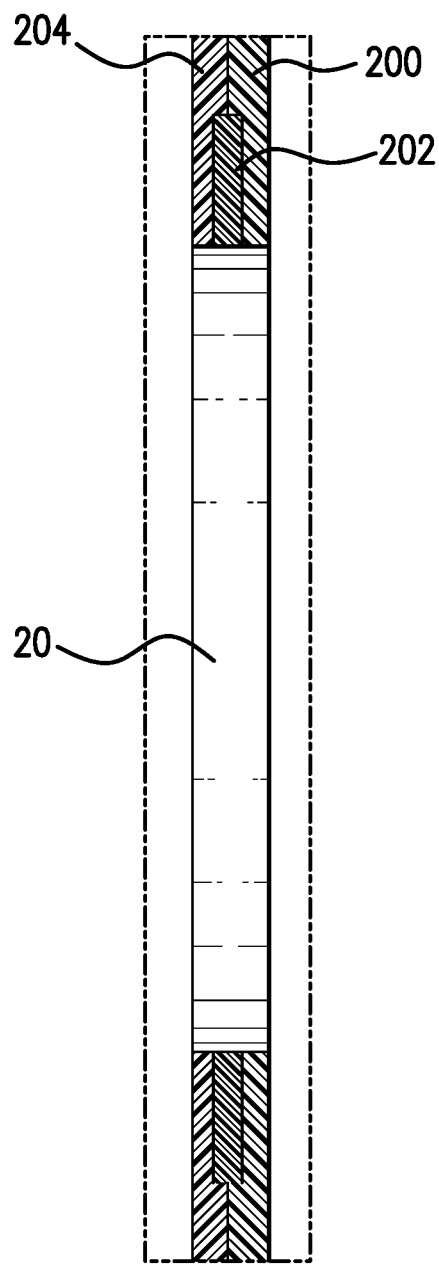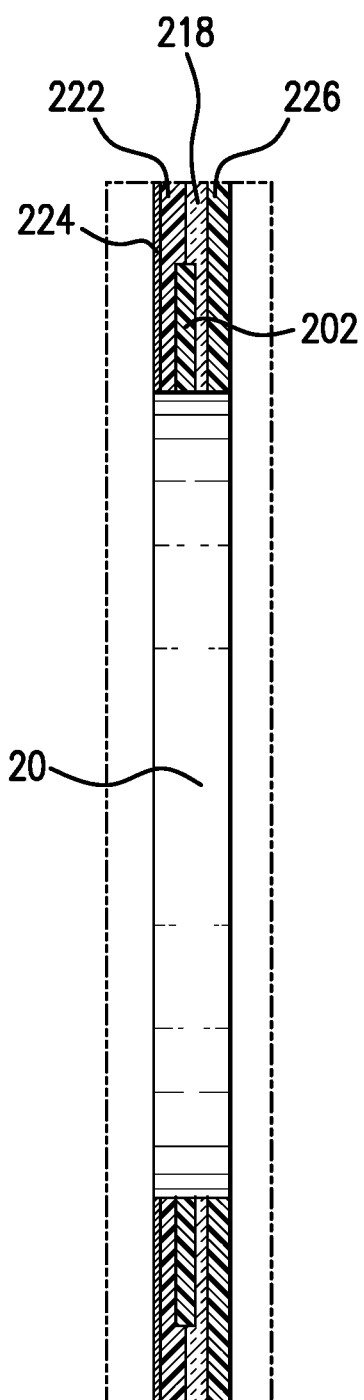
FIG. 6
FIG. 7

US 10,919,684 B2

LOW COST INSULATED CARRYING BAG

FIELD OF THE INVENTION

The present invention relates to the field of insulated carrying bags. In particular, the present invention relates to low-cost multilayer insulated carrying bags with enhanced structural features for aid in transport.

BACKGROUND

With the rise of online and app-based food ordering, home deliveries of temperature sensitive, cold or warm, or hot foods and other goods requiring protection from high or low ambient temperatures, have grown substantially. Traditional methods to protect such goods during transport from source to destination have included reusable insulated totes or single-use solutions including a combination of paper or plastic carrying bags with an insulated liner. The latter two solutions are used in combination since existing insulated liners are typically designed and built for use inside rigid devices such as corrugated containers, and therefore, lack the rigidity and carrying convenience needed to be used as a carrying device. Single-use, low cost insulating bags with carrying capability have also been produced, but they lack the carrying ability necessary for heavier goods since the materials they are made of are prone to tearing. The combined methods such as paper bag and insulated liner, while effective, present cost and convenience disadvantages in that two different items must be purchased, stored and handled in order to achieve the solution for effective temperature-controlled delivery of lightweight or heavy goods that can be easily carried. The need exists for a singular protective carrying device that provides easy carrying capability and protection from ambient temperatures and has a low total cost.

SUMMARY OF THE INVENTION

The subject matter of the present disclosure relates to improved insulated carrying bags and methods for its manufacture.

In one embodiment, the present disclosure provides an insulated carrying bag comprising a multilayer first panel comprising a top free edge, a bottom edge, a first side edge a second side edge, a strengthened section comprising strengthening material, and a holding aperture positioned in the strengthened section; a multilayer second panel comprising a top free edge, a bottom edge, a first side edge and a second side edge, a strengthened section comprising strengthening material, and a holding aperture positioned in the strengthened section; and a multilayer bottom panel comprising a front edge and a back edge. The first panel first side edge is connected to the second panel first side edge along the two edges of the panels. The first panel second side edge is connected to the second panel second side edge along the two edges of the panels. The first panel bottom edge is connected to the front edge of the bottom panel along the edges, and the second panel bottom edge is connected to the back edge along the two edges of the panels. The connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material. Although vapor barriers in general will provide improved protection, metalized films provide improved isolative properties due to their radiant barrier properties. For the purposes of this invention, radiant barrier and reflective films can be used interchangeably with vapor barrier materials.

In another embodiment, the present disclosure provides a process for producing an insulated carrying bag comprising a multilayer first panel comprising a top free edge, a bottom edge, a first side edge a second side edge, a strengthened section comprising strengthening material, and a holding aperture positioned in the strengthened section; a multilayer second panel comprising a top free edge, a bottom edge, a first side edge and a second side edge, a strengthened section comprising strengthening material, and a holding aperture positioned in the strengthened section; and a multilayer bottom panel comprising a front edge and a back edge. The first panel first side edge is connected to the second panel first side edge along the two edges. The first panel second side edge is connected to the second panel second side edge along the two edges. The first panel bottom edge is connected to the front edge of the bottom panel along the edges, and the second panel bottom edge is connected to the back edge along the edges. The connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material. The process comprises feeding the multilayer first panel, multilayer second panel and multilayer bottom panel to an assembly device; folding the multilayer bottom panel material; and inserting the folded multilayer bottom panel material between the multilayer first panel material and the multilayer second panel material; and then sealing and cutting the resultant material to form the insulated carrying bag.

In still another embodiment the present disclosure provides an insulated carrying bag comprising a multilayer first panel comprising a top free edge, a bottom edge, a first side edge a second side edge, a strengthened section comprising strengthening material, and a holding aperture positioned in the strengthened section; a multilayer second panel comprising a top free edge, a bottom edge, a first side edge and a second side edge, a strengthened section comprising strengthening material, and a holding aperture positioned in the strengthened section; a multilayer bottom panel comprising a front edge and a back edge, and a tamper-evident sealing device. The first panel first side edge is connected to the second panel first side edge along the two edges of the panels. The first panel second side edge is connected to the second panel second side edge along the two edges of the panels. The first panel bottom edge is connected to the front edge of the bottom panel along the edges, and the second panel bottom edge is connected to the back edge along the two edges of the panels. The connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material.

In another embodiment the present disclosure provides an insulated carrying bag comprising a multilayer first panel comprising a top free edge, a bottom edge, a first side edge a second side edge, a strengthened section comprising strengthening material, and a holding aperture positioned in the strengthened section; a multilayer second panel comprising a top free edge, a bottom edge, a first side edge and a second side edge, a strengthened section comprising strengthening material, and a holding aperture positioned in the strengthened section; a multilayer bottom panel comprising a front edge and a back edge, and a venting device connected to the first or second panel. The first panel first side edge is connected to the second panel first side edge along the two edges of the panels. The first panel second side edge is connected to the second panel second side edge along the two edges of the panels. The first panel bottom edge is connected to the front edge of the bottom panel along the edges, and the second panel bottom edge is connected to the back edge along the two edges of the panels. The connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material.

BRIEF DESCRIPTION OF THE DRAWINGS

The subject matter of the present disclosure will be more fully understood from the following detailed description, taken in connection with the accompanying drawings, in which:

FIG. 6 is an exploded view of the multilayer panel of the insulated carrying bag in the region of the holding apertures.

FIG. 7 is an alternate exploded view of the multilayer panel of the insulated carrying bag in the region of the holding apertures.

DETAILED DESCRIPTION OF THE INVENTION

Figure 1:
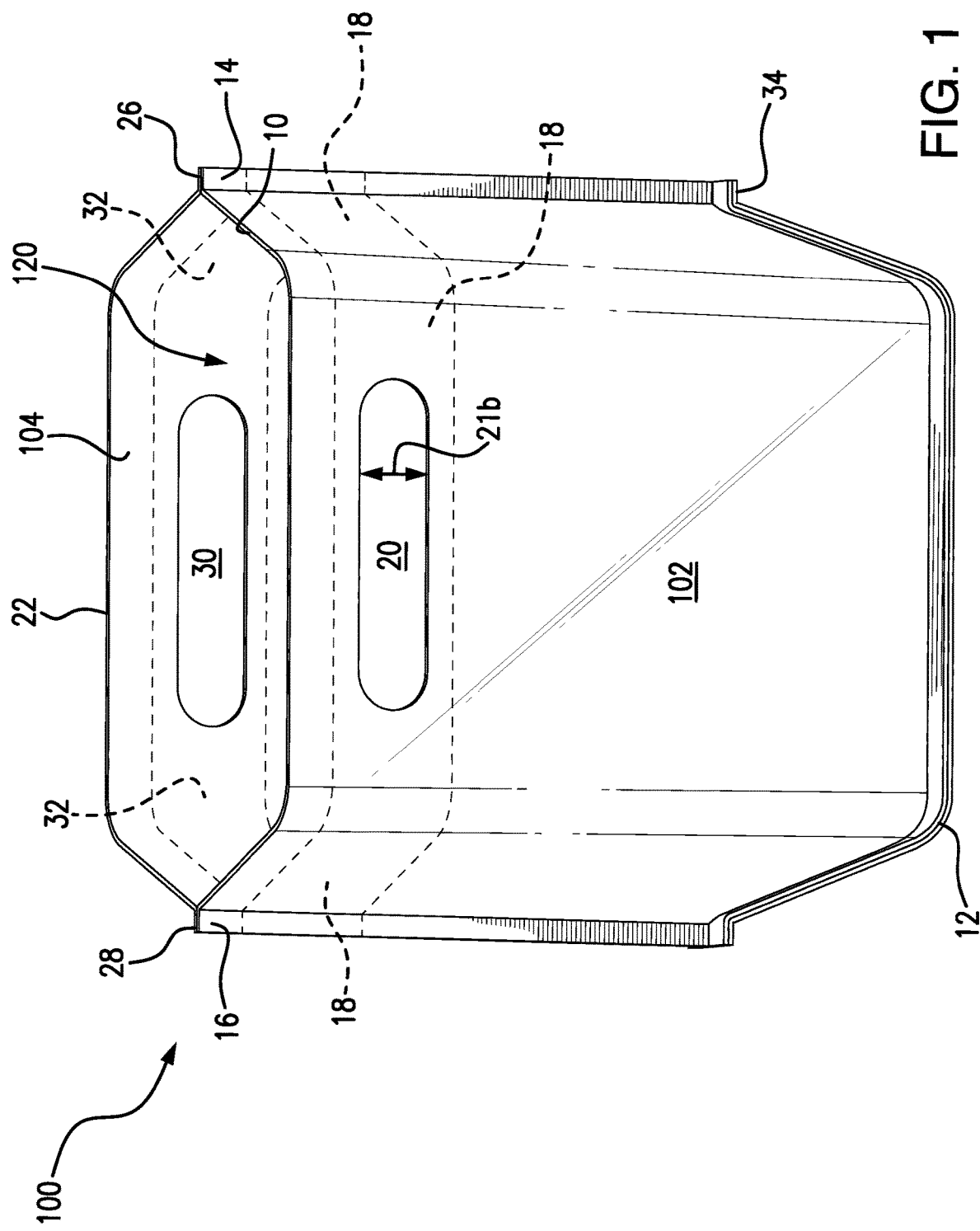
FIG. 1 shows a front perspective view of the insulated carrying bag.

The subject matter of the present disclosure relates to a low-cost solution for both transport and protection of goods using a novel insulated carrying bag, and method for manufacturing the same. The invention achieves this by utilizing an innovative method of selective strengthening of the materials by employing a supported carrying handle with a soft sided insulated bag in a unique method of manufacturing of the bags. This method allows for the high speed, automated production of single-use, low cost insulated carrying bags that require no combined additional carrying devices. The selective strengthening prevents sagging of the bag when loaded about the handles compared to non-strengthened bags, as well as conferring a lighter, more flexible feel to the bag. This is a desirable enhancement over conventional bags that do not selectively strengthen the bag, i.e., the majority of the bag is strengthened, because the selective strengthening communicates to the user that the bag is a single-use and/or environmentally friendly material, and not a heavy duty/wasteful article. The lighter feel to the bag also conveys the sense to the user that shipping costs will be minimized, compared to conventionally strengthened bags. Finally, there are efficiencies in the thermal performance of lighter gauge structures. The placement of the strengthening material and its interaction with the holding apertures on the first and second panels provides enhanced performance by acting to improve the distribution of the load carried.

Conventional insulating bags incorporate low cost, single-use thermoplastic materials with integrated handles; but the corresponding manufacturing processes lack the step of providing the selective strengthening of the materials. The aforementioned strengthening presents great advantages when compared to conventional bags providing improved tear resistance and load distribution, where the strengthening material has the transforming effect of providing tear resistance to a material that typically tears easily. This tear resistance when placed in the hand-hole region, allows for the production of a carrying bag with improved weight capability.

The placement of the strengthening material in the hand-hole region has additional advantages that include the distribution of weight for the load placed into the bag. A typical plastic bag when loaded with weight and lifted in a relatively small hand-hole region will present sagging in the regions adjacent the hand-hole. This sagging can result in reduced comfort in handling by the user and other disadvantages. The strengthening material incorporated in the bags of the current subject matter has the added advantage of the distribution of the weight of the goods placed inside the bag, thereby reducing the sagging near the said hand-hole. By way of example, the strengthening material can be made of materials such as plastic films, elastic polymers including low density polyethylene, polypropylene, in single or multi-layer form. Additionally, such films can be manufactured with high melt materials, such as nylon or polyethylene materials containing comonomers of hexene or octene to increase their heat resistance and melt points. Other examples include strengthening plastic materials that resist tearing. The strengthening material can comprise multiple layers of materials that are different, as thickness and differing properties of the layers could enhance a resistance to tearing.

The insulated carrying bag of the present subject matter generally has a box-like shape when open, with holding apertures; i.e., hand holes for ease of transportation, and is open for access through its top. The holding apertures are configured to accommodate a person's hand in carrying the bag, and generally have a rectangular or oval shape. The holding apertures have a width corresponding to the vertical distance from the top to the bottom of the aperture at their maximum separation.

The bags include a first front panel, a second back panel and a bottom panel that are interconnected, such that when the bag is open, the panels form a compartment accessible through its open top. The front and back panels and bottom panel of the bag are multilayer, and each contain a thermoplastic insulating layer and a vapor barrier layer to maintain the environmental conditions within the bag to protect its contents from damage or spoilage. The bag is specially-designed to contain a section in the area of the hand holds that is reinforced with a strengthening material, where the holding apertures are positioned within the strengthened section. The strengthened section is present as a separate layer than the insulating thermoplastic layer and the vapor barrier layer in the multilayer structure and is positioned between the thermoplastic insulating layer and the vapor barrier layer. Typically, the strengthened section extends across both the front and back panels running parallel to the top free edges, and is positioned symmetrically about the vertical access on the first front and second back panels. The strengthened section is typically positioned from the horizontal midline of the front/back panels to the top free edge of the front/back panels. Preferably, the strengthened section extends from above the horizontal midline to the top free edge. More preferably, the strengthened section extends from a position four holding aperture widths below the top free edge to the top free edge. Most preferably, the strengthened section extends from the bottom of the holding aperture to the top of the holding aperture.

The bag may optionally contain a sealing device below the hand holds to provide a hermetic closure. Preferably, the sealing device is selected from an adhesive strip, press-seal closure, or slide lock closure. The sealing device may also be tamper evident. For the purposes of this specification the term "tamper evident" means that the sealing device shows visible evidence to the consumer that tampering has occurred. For example, in one embodiment the tamper evident seal will self-destruct to indicate the seal has been broken. In another embodiment, the insulated carrying bag may contain a venting device that is attached to the front or back panel, for venting the bag. Preferably, the venting device is connected to the sealing device, which in turn is connected to the front or back panel.

Figure 9:
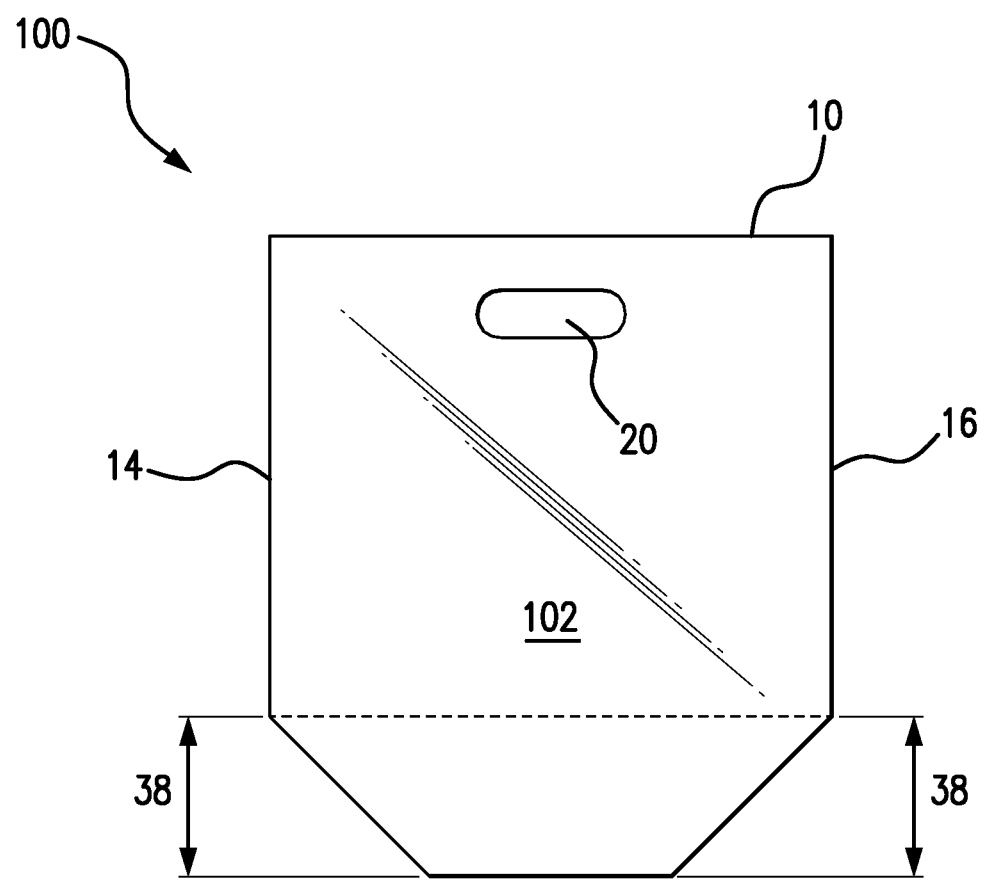
FIG. 9 is a front view of the folded, flat insulated carrying bag with gussets.

The front and back panels are generally of square or rectangular shape. Because the bag is designed to be capable of being folded or opened up, the bottom panel layer is equipped with gussets that confer a generally oval or hexagonal shape to the bottom panel. When the bag is folded flat, the gusset extends downward as shown in FIG. 9. The gussets allow the bag to expand and forms the interior of the bag. The front and back panels of the bag oppose each other, as do the bottom panel of the bag and the bag opening when the bag is unfolded. Each of the front and back panels are oriented vertically, and have a top free edge corresponding to the open top of the bag, a bottom edge that is proximate to the bottom panel, and two side edges. The bottom panel layer is oriented horizontally when the bag is in an open position ready to be loaded with goods and has a front edge and a back edge. Because of the gusset running along the long axis of the bottom layer, the bottom panel front edge and back edge on each side are angled or curved toward each other from opposite sides when the bag is opened, and meet at the intersection with the long axis. The front and back panels are attached to each other along their two corresponding side edges. The front panel is attached to the bottom panel along its front edge. The back panel is also attached to bottom panel along its back edge.

The front panel, also referred to in this specification as the first panel; and the back panel, also referred to in this specification, as the second panel, are multilayer materials containing an insulating thermoplastic layer and a vapor barrier layer. The insulating thermoplastic layer is selected from a low density polyethylene bubble material, thermoplastic cushioning material, a polyethylene foam cushioning material or combinations thereof. The vapor barrier material is selected from a metalized polyester attached to a polyethylene film, multi-layer polyethylene film, a metalized polyethylene film, a barrier film, or a nylon-containing polyethylene film.

Insulating Thermoplastic Layer

The insulating thermoplastic layer is selected from low density polyethylene bubble material, thermoplastic cushioning material, a polyethylene foam cushioning material or combinations thereof.

A. Low Density Polyethylene Bubble Material

When the insulating thermoplastic layer is polyethylene bubble material, a first polyethylene film is first fed to a heated roll system comprising a first vacuum roller comprising dimples and a second roller, wherein the first vacuum roller contacts the first heated polyethylene film, thereby forming a bubble layer having a top side and an unsealed bottom side. A second polyethylene film is also fed to the heated roll system, wherein one side of the second heated polyethylene film contacts the unsealed bottom side of the bubble layer while under pressure, thereby sealing the bubble layer with a bubble base layer. Preferably, both the first and second polyethylene films are low density polyethylene material as described above. Optionally, a third polyethylene layer can be attached to the bubble layer forming a bubble cover layer. Preferably, each of the first, second and third polyethylene films are low density polyethylene material. For the purposes of this application, a low-density polyethylene (LDPE) is a polyethylene having a density of 0.910 g/cc to 0.925 g/cc, where the polyethylene can be a homopolymer of ethylene or a copolymer of ethylene with an alpha-olefin $CH_2$=CHR, wherein R is an alkyl radical containing from 1 to 18 atoms of carbon. When a metalized vapor barrier is used, preferably the bubble layer and bubble base layer are clear. This configuration is effective in reflecting heat back into the bag, which is desirable for protecting hot or warm goods.

B. Thermoplastic Cushioning Material

When the insulating thermoplastic layer is thermoplastic cushioning material it is selected from polyethylene or polypropylene materials having a cellular or fibrous form.

C. Polyethylene Foam Cushioning Material

When the insulating thermoplastic layer is a polyethylene foam cushioning material, the layer is produced from a polyethylene resin heated in a process where a bubbling or foaming effect is induced. It is then made into a film put through a die ⅟₃₆" to ½" thick, so that when cooled the stable and firm film maintains the bubbling that results in insulating properties.

Vapor Barrier Layer

The vapor barrier material is selected from a metalized polyester attached to a polyethylene film, multi-layer polyethylene film, aluminum oxide containing film structure, silicon oxide containing film structure, an ethylene vinyl alcohol film structure, linear low density polyethylene film, polypropylene containing film structure, an high density polyethylene containing film structure, a metalized polyethylene film, or a nylon-containing polyethylene film.

D. Metallized Polyester Attached to Polyethylene Film

The preferred vapor barrier layer is a metalized polyester film attached to a polyethylene film, the total layer having a thickness of 0.25 to 1.5 mil. Preferably, the total layer has a thickness of 1.0 to 1.5 mil. For the purposes of this specification, the term "mil" means 0.001 inch. The metalized polyester film is attached to the polyethylene film by extrusion coating or lamination using an adhesive material. The metal used in the metallization is preferably aluminum. The metallization can be conducted in any manner well known to those skilled in the art. Preferably, the method is by vacuum deposition. The thickness layer of the metal on the film after metallization is preferably 2 to 100 micron, More preferably, the thickness of the layer is 5 to 75 micron. Most preferably, the thickness is 10 to 50 micron.

E. Multilayer Polyethylene Film

When the vapor barrier layer is a multilayer polyethylene film it is preferably two or more co-extruded layers F. Metalized Polyethylene Film When the vapor barrier layer is a metalized polyethylene film, the metalized polyethylene film has a total thickness of 0.30 to 3.0 mil, and contains a metal layer and a barrier base layer. Preferably, the metalized polyethylene film thickness is 0.50 to 1.0 mil. The metalization process is as described above. The metalized polyethylene film is produced by vacuum metalization of a corona treated polyethylene film. Preferably, the film is tinted white.

G. Nylon-Containing Polyethylene Film

When the vapor barrier layer is a nylon-containing polyethylene film, the film has a thickness of 0.5 to 2.5 mil. Preferably, the thickness of the nylon-containing low density polyethylene film has a thickness of 0.75 to 1.5 mil. The nylon-containing low density polyethylene film is produced by formation of a multi-layer structure of film, where the extruded layers include at least one layer of nylon containing film that is bonded to other layers of film that do not contain nylon.

H. Other Vapor Barrier and Radiant Barrier Materials

The vapor barrier and radiant barrier material can also be selected from an metalized BOPP (biaxially-oriented polypropylene), metalized BON (biaxially oriented nylon), metalized Biaxially Oriented Polyethylene Terephthalate (BO-PET), metalized Polyvinylidene chloride or PVdC, aluminum oxide containing film structure, a silicon oxide containing film structure, an ethylene vinyl alcohol film structure, linear low density polyethylene film, polypropylene containing film structure, or a high density polyethylene containing film structure. Film thicknesses are preferably in the range of 0.5 to 2.5 mil.

Strengthening Section

The film corresponding to the strengthening material is selected from a low density polyethylene film, polypropylene film, elastic polymers, and a nylon-containing low density polyethylene film, or thermoplastic woven material such as netting or textiles manufactured from thermoplastic yarn, thread or other material that can be woven. Non-woven material such as polyester or polyethylene fiber bonded together creating a fabric like consistency, preferably, using a spun bonding process in a single or multi-layer form can also be used. The strengthening material can be one or more layers, with the layers being the same or different. Preferably, the layers are different.

I. Low Density PE Film Strengthening Material

When the strengthening material is a low density polyethylene film, the film layer has a thickness of 1.0 to 6.0 mil. More preferably, the thickness is 1.5 to 3.0 mil. Even more preferably, the thickness is 2.0 to 3.0 mil. The low density polyethylene film is produced by an extrusion process where the low density polyethylene film is heated and put through a die that determines the end thickness of the film, then the film is cooled and wound, or put directly into a secondary manufacturing process.

J. Nylon-Containing Low Density PE Film

When the strengthening material is a nylon-containing low density polyethylene film, the film layer has a thickness 1.0 to 6.0 mil. More preferably, the thickness is 1.5 to 3.0 mil. The nylon-containing low density polyethylene film is produced by formation of a multi-layer structure of film, where the extruded layers include at least one layer of nylon containing film that is bonded to other layers of film that do not contain nylon.

K. Polypropylene or Elastic Polymer Film

When the strengthening material is a polypropylene film or elastic polymers, the polymer is selected from propylene homopolymers or copolymers of propylene with $C_2$-$C_8$ comonomers.

L. Thermoplastic Woven or Non-Woven Material

When the strengthening material is a thermoplastic woven or nonwoven material it is produced by or thermoplastic woven material such as netting or textiles manufactured from thermoplastic yarn, thread or other material that can be woven. Non-woven material such as polyester or polyethylene fiber is bonded together creating a fabric like consistency, preferably, using a spun bonding process in a single or multi-material form.

Except as described below, the various components of the insulating carrying bag: front panel, back panel and bottom panel are typically attached to each other by hot press rolling (heat and pressure), or alternately with adhesives, sonic welding or mechanical pressure, with folding as necessary to produce the bag gussets, the details of which are described below.

Preparation of Insulated Carrying Bag

The insulated carrying bag is comprised of a first panel, second panel and bottom panel of insulation material that are connected together. The material for the panels is manufactured using multiple individual film webs that are each unwound from the appropriate size roll stock. Alternatively, as few as a single panel of strengthened insulation material can be used, wherein a web can be folded or shaped and further converted to produce the square bottom carrying device. Also, the materials can be processed while originating in a bubble or other bulky cushioning material manufacturing and combining process as an alternative to roll storage and utilization.

Preferably, the thermoplastic insulating layer comprises a bubble film layer. The bubble film manufacturing process is typically performed by applying heat and suction to a thermoplastic film that starts out as a film on a roll, or alternatively as a resin that is extruded into a film. Such film is heated immediately before or while simultaneously being run over a suction roller with a pattern of impressions that match the pattern of bubbles of the bubble film being manufactured. After the suction is applied to the heated film, the 'dimples' formed by the suction are encapsulated by applying another film to the 'bottom' of the structure to seal off the dimples that were created. This film that seals the bottom of the structure is the bubble base layer. This combined structure is typically cooled to create a firm, stable plastic bubble film, but complete cooling can be delayed or reheating can be performed so as to add an additional laminate structure using heat and pressure on top of the bubble material that is formed; such as a vapor barrier or metalized layer. Alternative methods of bonding of the laminate structures include adhesives, sonic welding, or mechanical pressure. A vapor barrier material or other desired material may be added to the top and/or bottom of the plastic bubble film. In addition, strengthening material is added during the process in a strategic location to maximize performance and efficiency, and is placed in between the bubble material and the vapor barrier material, such as metalized polyester. The final step in such a manufacturing process is the winding of the finished bubble film into a roll.

Then the roll of bubble film is ready for a subsequent manufacturing step for converting into bubble bags or other articles.

For the purposes of the invention, an alternative to creating a roll of bubble film and transferring that roll into a subsequent process for fabrication of bubble bags is to feed the bubble film directly into a converting process while it is manufactured. This method is advantageous since cushioning materials are typically bulky, and the linear yield of rolls of the same are relatively low when compared to flat films. If bubble film rolls are used in a bubble bag converting process, frequent stoppage of bag converting and changeover of rolls will be required. The advantage of the alternate manufacturing method is that the inline production method of producing bubble film with the necessary laminate and strengthening structure, allows feeding directly into the bag converting process, skipping the roll storage altogether. Using the direct conversion process, each production run will be significantly longer and changeovers less frequent, since instead of bulky rolls of bubble film, the 'raw material' of such a bag converting process will be the flat film or strengthening material being fed into the bubble manufacturing process. Both such raw materials are available in roll forms that are significantly higher yield. When resin is used to create the bubble material or other components, there is a theoretically infinite yield since such resins can typically be replenished without stopping the production process using existing hardware and technology; when considering the extruded materials and their replenishment only. Similar advantages exist for other cushioning/insulating materials such as expanded polyethylene or other similar materials. An alternative method of adding strengthening material to the insulation materials can be attachment of the same to the exterior portions of the combined cushioning and vapor barrier material, using an adhesive or other fastening method.

The web-based manufacturing method involves multiple webs of cushioning/insulating material that are subjected to a converting process to produce the insulated bag. If in roll form, the various rolls are placed in strategic positions so that when they are unwound, they are easily processed to allow for the correct sealing and cutting steps to produce the correct sized bag. For example, in one embodiment, the first and second panels and a bottom panel of the insulated carrying bag are represented by three rolls of cushioning/insulating material being unwound into three webs; wherein the bottom gusset web is folded and inserted in between the top and bottom web. The structure is then sealed together connecting the bottom gusset to the top and bottom webs, then cut and sealed to length to create a single square bottom bag. In another embodiment, a single roll of material is unwound and folded into a two-ply web, after which the folding device places a bottom gusset at the fold area, and such an adjusted web is segmented to create a square bottom pouch. In yet another embodiment, a single roll of material is formed into a flat pouch that is then sealed and cut to size, creating a flat pouch suitable for holding products yet with relatively lower expansion ability and aesthetic appearance when loaded with goods.

The insulation materials, such as polyethylene bubble film laminated to metalized polyester, are typically produced with a heat sealable thermoplastic on one side only; allowing for easy heat seal capability. Adhesives can be used as an alternative to heat sealable materials.

In one method, the materials may be connected in a sequence of steps that creates a bag with a bottom gusset or pocket allowing the bag to open in three dimensions, allowing for additional volume of goods to be packaged. The insulated carrying bag can have an integrated carrying handle formed from the holding apertures in the first and second panels that allows for easy holding and portability of goods inside. Such goods when carried can be of little to substantial weight. The steps in the converting process can include heat sealing the thermoplastic portions of the cushioning/insulating material (such as bubble film) that comprise the bottom, sides and gussets, cutting to finalize gussets and to segment the web into individual bags of the proper size and die cutting or other method of creating an integrated hand hole; all are performed in a sequence or at once; while the creating of the hand hole can be performed at any time. The gusseting is an option that provides more volume to the bag. During this converting process, the integrated hand hole can be created in the bag by mechanical punching, thermal burning, or melting methods.

Another aspect of the current subject matter involves the manufacture of the insulation material, wherein a strengthening method is performed during this process to improve the tear resistance of the panels. An improved hand-hole is formed by the holding apertures into the insulated carrying bag to create a handle portion that will not tear when a load is applied to the bag. The insulation material, made of a combined thermoplastic and vapor barrier, is produced and stored in possibly roll form. During production, a unique step is taken where only a certain portion of the roll is strengthened; this selective strengthening presents cost and other advantages as further described below.

In the preferred embodiment, the result of the manufacturing process is a two-ply bag having an outer layer made of a vapor barrier and an inner layer made of thermoplastic. In between the outer layer and the inner layer may be one or more strips of a strengthening material. The insulated carrying bag is defined by the bottom panel, first and second panels and an opening opposite the bottom defined by the panel top free edges of the first and second panels. Near the opening, on the first and second panels is the strengthening material running parallel with the top free edges. Hand-hole apertures can be punched through the sidewalls and through the strengthening material. The creation of hand-holes results in the formation of the handles. Because the hand-holes are created through the strengthening material, the handles are much stronger than they would have been without the strengthening material.

The addition of the strengthening material creates a significant improvement in the weight capacity of the bag in that it provides significant tear resistance to the integrated hand hole. Additionally, since vapor barriers like metalized polyester are typically more rigid than other polymers like polyethylene; when such components are exposed to die cutting and other methods of applying the hand hole, fractures or micro-fractures can be created that will 'run' or contribute to tearing when a load is applied to them. Since the strengthening materials are typically elastic polymers that resist tearing such as low density polyethylene film, their addition to such low elasticity structures enhances the tear resistance of the combined structure. In testing, bags with strengthened integrated hand holes demonstrate significantly larger weight capacity compared to bags with non-strengthened hand holes, and tearing of the integrated hand hole is negligible to null. In fact, such strengthened hand holes demonstrate such a tear resistance that other portions of the bag tend to tear first when load is gradually increased in a failure test. The strengthened bags have demonstrated up to five times or greater the weight capacity of un-strengthened bags. The selective strengthening is performed by providing a roll of strengthening material that may be combined with the other components during the manufacture combining process. A typical method is lamination, where the strengthening material may be provided in a size of web sufficient for the improved functioning of the finished bag, but narrower than the entire web of material or materials involved in the portion of the bag with a handhole. This reduced width provides a cost advantage because it is unnecessary for the full width of material to be strengthened. An additional cost savings results from the strengthened integrated hand hole allowing the use of thin and lower cost materials for the cushioning and vapor barrier materials used to create the bag. Since only the hand hole area is reinforced, the majority of the material used to create the bag will be of lower cost, thinner material, thus lowering the manufacturing cost of the bag.

The unique process of insertion of the strengthening material involves placement in between the vapor barrier layer and thermoplastic insulating layer so that the finished product presents integrated strengthening. Thus, one side of the layer comprising the strengthening material contacts the vapor barrier layer and the other side contacts the thermoplastic insulating layer, where the vapor barrier faces the environment and the thermoplastic layer faces the interior of the bag. Otherwise, if the strengthening material was attached to the outside of the thermoplastic or vapor barrier material, the strengthening effect may be less pronounced and there is higher risk of its detachment under a load. Heat and/or adhesives can be used during the combining and lamination process, and if the strengthening material is of like materials with one of the constituents, such as the thermoplastic portion, a heating process can be used to create a combining effect. A benefit of the combining effect is the facilitation of the placement of the integrated handle wherein, a thicker stiffer plastic or combination of materials allows easier mechanical cutting; especially when considering the mechanical cutting of soft or cushioning materials.

Figure 4:
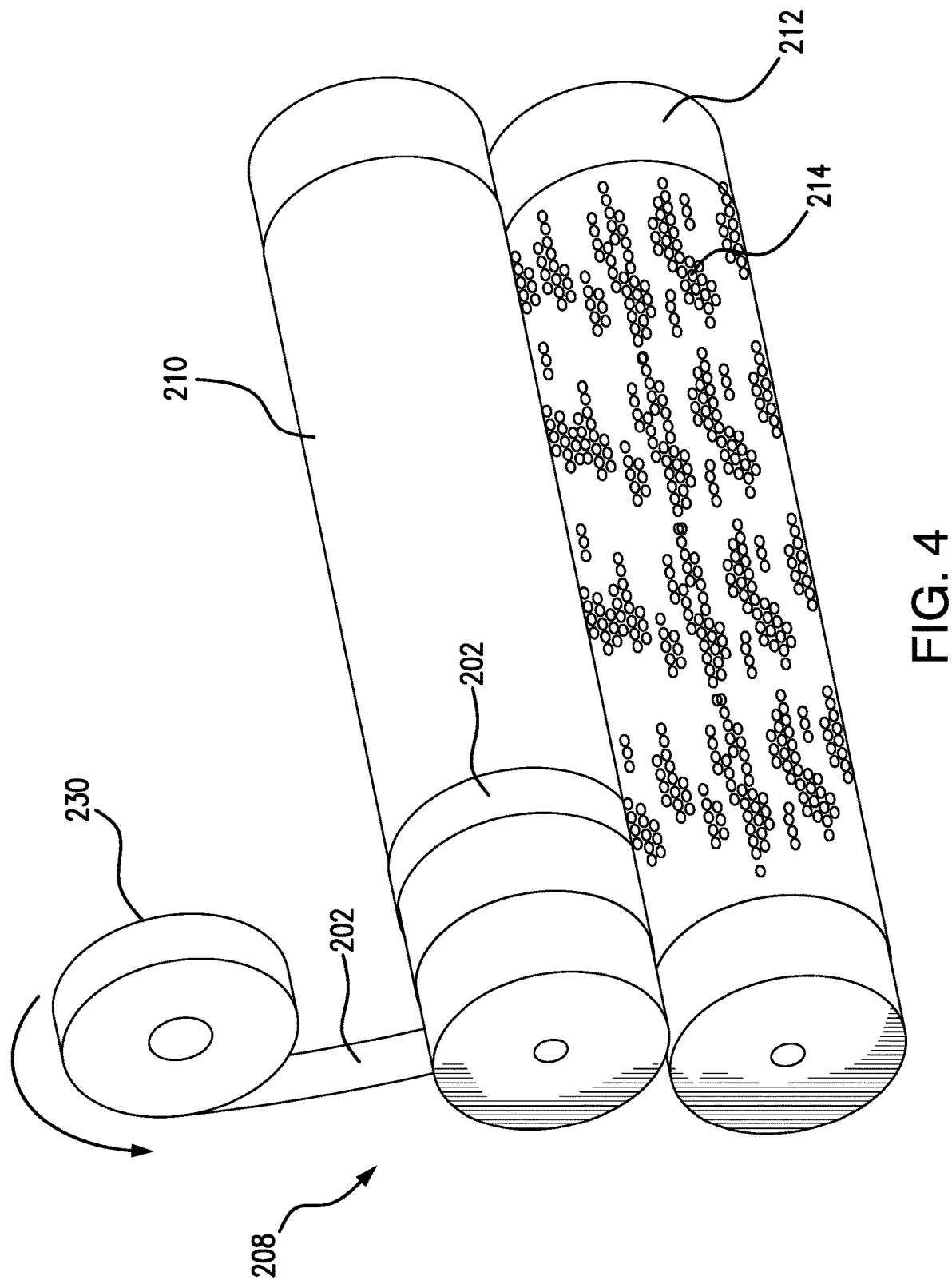
FIG. 4 shows a roller assembly for producing panels of the insulated carrying bag, along with a strengthening material unwind roller.

A method of adding the strengthening material is highlighted in FIG. 4 where a roll of strengthening material is positioned and the web of strengthening material is guided using rollers to be fed in between the thermoplastic and vapor barrier material during the joining process. Additionally, the narrower tear resistant material can be added to the vapor barrier and/or cushioning materials prior to the process where the two are adjoined.

The effect of adding a strengthening material is pronounced given that typical vapor barriers like metalized polyester film are prone to tearing if weakened. The combination of a strengthening material and tear-prone materials has advantages; however, additional strengthening materials provide an added benefit of a multi-layer strengthening. Similar to multi-thread rope or other materials where multiple layers provide added breakage resistance, this enhancement is an added benefit in tear resistance of an integrated hand hole as well as increased strength of the combined material. Further, if a strengthening material with a higher melt temperature due to chemical make up or gauge is used in a heat facilitated combining step, the strengthening effect may be improved because of the multi-layer enhancement since the multiple melting temperatures will resist full combining of the materials. Additionally, a higher melt temp of the strengthening material further assists in the combining process when heat is used in that the insertion process is facilitated. The insertion process involving thermoplastics into a heat lamination process requires careful placement of the 'webs' of material being combined and since both heat and tension are applied, a narrow web of material such as the strengthening material, has a risk of breaking when dispensed during production. Therefore, a higher melting temperature of the narrower strengthening material will assist in maintaining an unbroken web where heat and tension are applied during the combining process where heat and tension are present since the higher melt temperature allows the material to stay firm while encountering the same heat necessary to melt/combine other materials used in the process. Further, in the traditional combining process for manufacturing insulation material, where the thermoplastic cushioning material is combined with the vapor barrier material, both webs of materials are presented in similar widths. The subject matter of the current subject matter describes a method where the strengthening material inserted during the process described above, is performed in the select region of the webs so that when such webs are later placed in the aforementioned bag converting process, the strengthening material will lie in the aforementioned integrated hand-hole or handle region. For efficiency in manufacturing, multiple webs can be reinforced during the combining process to be later used in the manufacture of multiple bags at a time.

Figure 5:
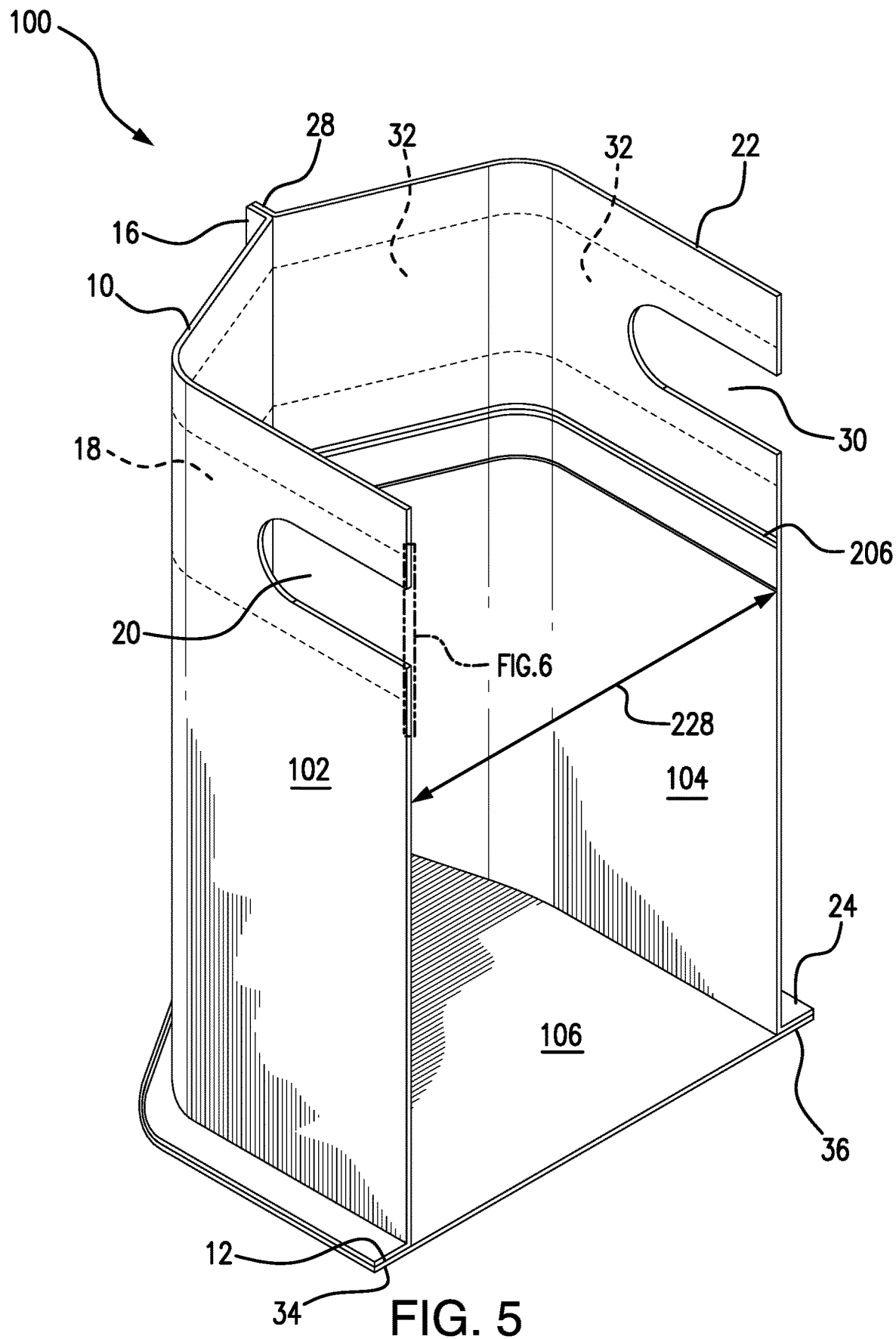
FIG. 5 is a sectional perspective view of the insulated carrying bag.

To aid in the performance and closure of the bag, a sealing device selected from an adhesive or closure material can be applied to the area below the holding apertures, as shown in FIG. 5. Once the contents have been added to the bag, the backing covering the adhesive can be removed and the panels of the bag can be pressed together to seal the bag closed, or the closure material can be engaged. The sealing device can be an adhesive strip, a press-seal closure or a slide lock closure. In one embodiment, the sealing device can be tamper evident.

Referring now to FIG. 1, shown is a frontal perspective view of insulating bag 100 with opening 120 and having first panel 102 and second panel 104. The first panel 102 has a strengthened section 18, a top free edge 10, a first side edge 14, a second side edge 16, bottom edge 12, and a holding aperture 20 having a width 21*b*. The second panel 104, has a strengthened section 32, a top free edge 22, a first side edge 26, a second side edge 28, and a holding aperture 30. The first panel first side edge 14 is connected to the second panel first side edge 26 along the portions of the two side edges. The first panel second side edge 16 is connected to the second panel second side edge 28 along the portions of the two side edges. The first panel bottom edge 12 is connected to the bottom panel front edge 34 along the portions of the two edges. When the bag 100 would be carried, holding apertures 20 and 30 would form a carrying handle.

Figure 2:
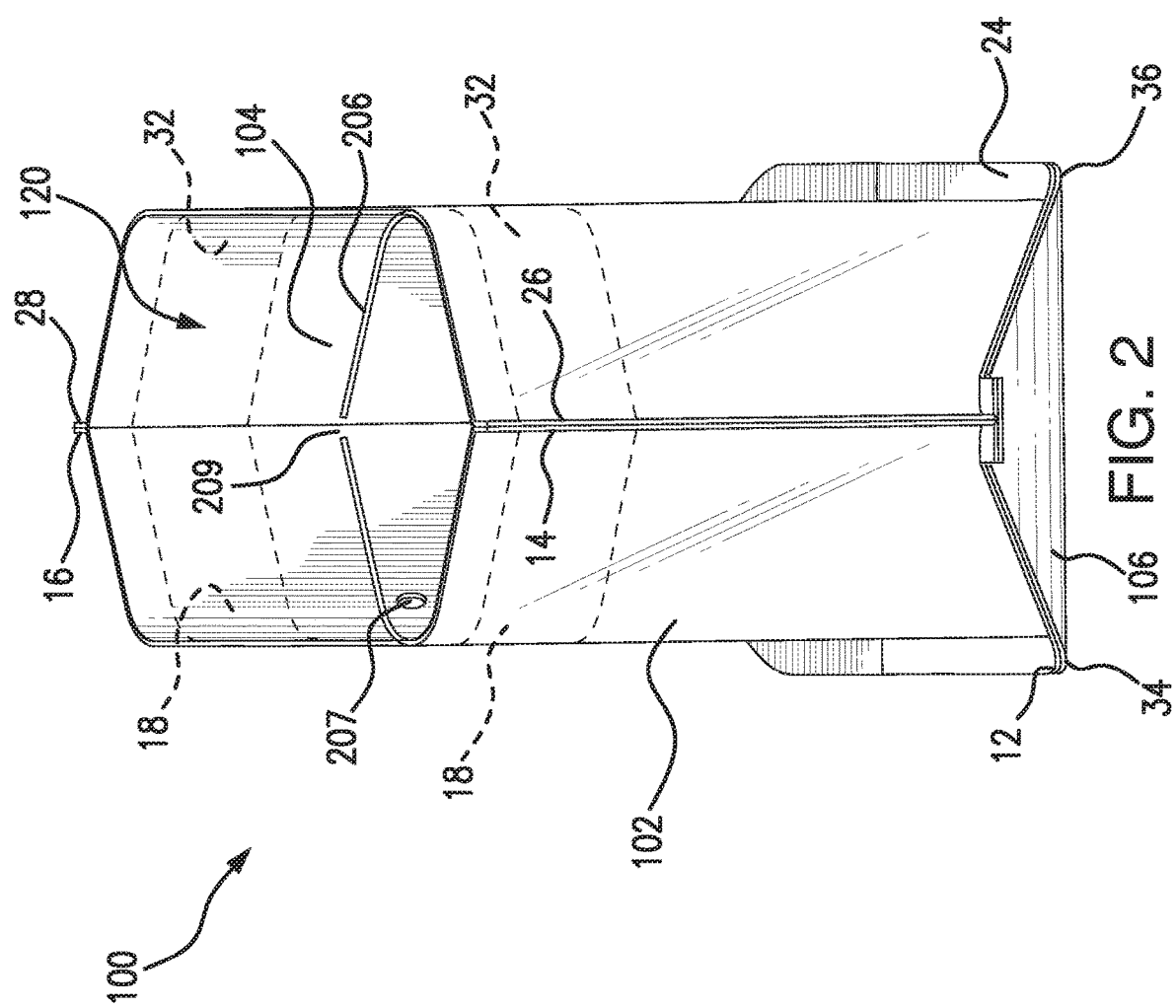
FIG. 2 shows a side perspective view of the insulated carrying bag.

Referring now to FIG. 2, shown is a side perspective of insulating bag 100 with opening 120 and having first panel 102, second panel 104, and bottom panel 106. The first panel 102 has a strengthened section 18, a first side edge 14, a second side edge 16, and bottom edge 12. The second panel 104 has a strengthened section 32, first side edge 26, and second side edge 28. The first panel first side edge 14 is connected to the second panel first side edge 26 along the portions of the two side edges. The first panel second side edge 16 is connected to the second panel second side edge 28 along the portions of the two side edges. The first panel bottom edge 12 is connected to the bottom panel front edge 34 along the portions of the two edges. The second panel bottom edge 24 is connected to the bottom panel back edge 36 along the portions of the two edges. Venting device 207 is shown attached to first panel 102. Venting device 209 is shown connected to sealing device 206 as an incomplete closure mechanism.

Figure 3:
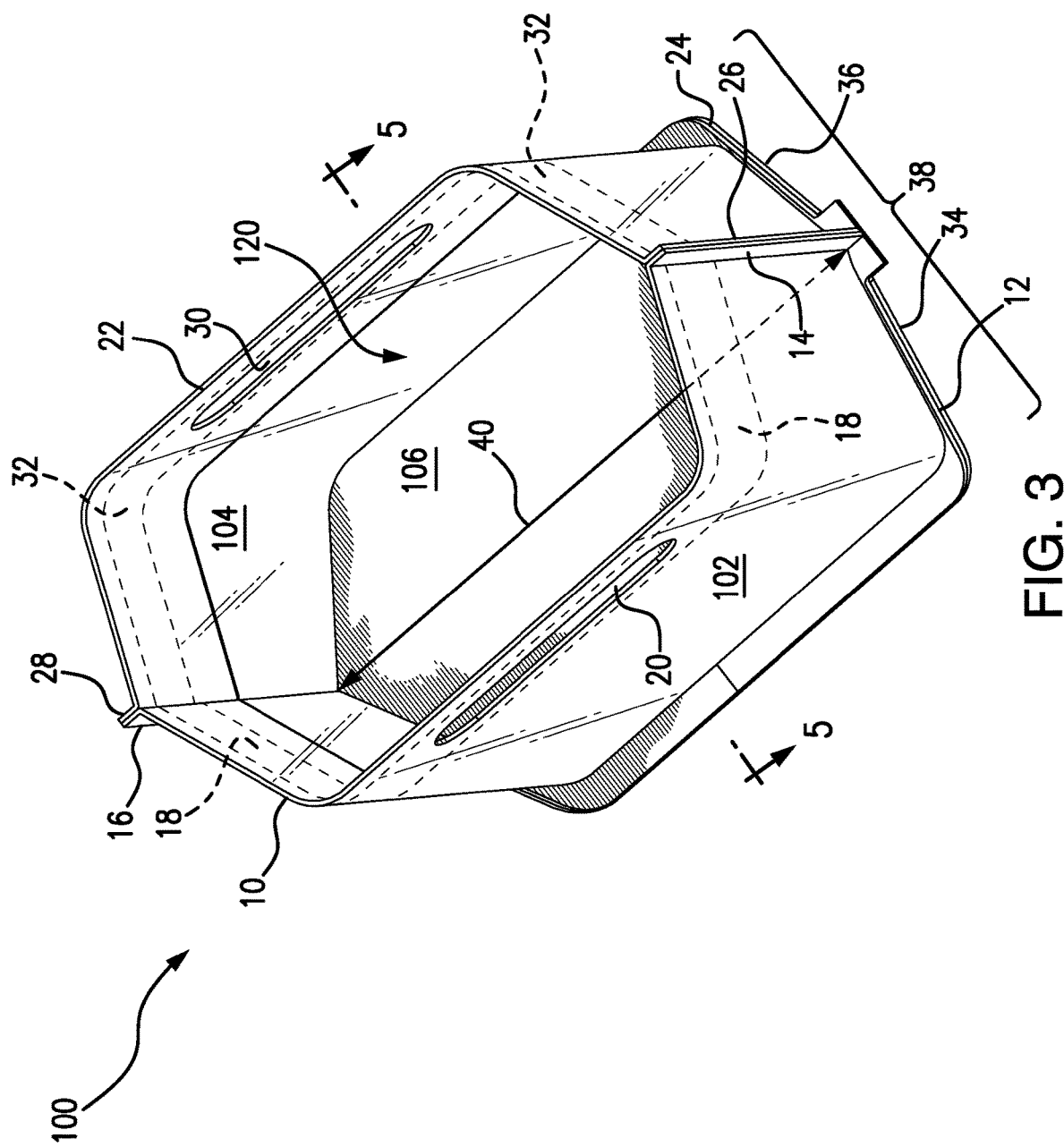
FIG. 3 shows a top perspective view of the insulated carrying bag.

Referring now to FIG. 3, shown is a top perspective view of insulating bag 100 with opening 120 and having first panel 102, second panel 104, bottom panel 106 having a longitudinal axis 40, and a gusset 38. The first panel 102 has a strengthened section 18, a top free edge 10, a first side edge 14, a second side edge 16 and bottom edge 12, and a holding aperture 20. The second panel 104, has a strengthened section 32, a top free edge 22, a first side edge 26, a second side edge 28, a bottom edge 24, and a holding aperture 30. The bottom panel 106 has front edge 34 and back edge 36. The first panel first side edge 14 is connected to the second panel first side edge 26 along the portions of the two side edges. The first panel second side edge 16 is connected to the second panel second side edge 28 along the portions of the two side edges. The first panel bottom edge 12 is connected to the bottom panel front edge 34 along the portions of the two edges. The second panel bottom edge 24 is connected to the bottom panel back edge 36 along the portions of the two edges. When the bag 100 would be carried, holding apertures 20 and 30 would form a carrying handle.

Referring now to FIG. 4, shown is a perspective view of roller assembly 208 containing first roller 210, second roller 212, second roller dimples 214, and strengthening material unwind roller 230, where the strengthening material 202 is being deposited on a film layer.

Referring now to FIG. 5, shown is a sectional perspective view of the insulating bag 100 with first panel 102, second panel 104, bottom panel 106, sealing device 206, and midline 228. The first panel 102 has a strengthened section 18, a top free edge 10, a second side edge 16, bottom edge 12, and a holding aperture 20. The second panel 104, has a strengthened section 32, a top free edge 22, a second side edge 28, a bottom edge 24, and a holding aperture 30. The bottom panel 106 has front edge 34 and back edge 36. The first panel second side edge 16 is connected to the second panel second side edge 28 along the portions of the two side edges. The first panel bottom edge 12 is connected to the bottom panel front edge 34 along the portions of the two edges. The second panel bottom edge 24 is connected to the bottom panel back edge 36 along the portions of the two edges.

Referring now to FIG. 6, shown is an exploded sectional view of first panel 102 in the area of the strengthening section as shown in FIG. 5. The first panel 102 in the area of the strengthening section contains vapor barrier layer 204, strengthening layer 202, and thermoplastic insulating layer 200. Where one side of the vapor barrier layer 204 faces the environment outside the bag, one side of the thermoplastic layer 200 faces the interior of the bag, and one side of both 204 and 200 contact strengthening layer 202.

Referring now to FIG. 7, shown is an alternate exploded sectional view of first panel 102 in the area of the strengthening section. Barrier layer contains metal layer 224, a barrier layer substrate 222, strengthening layer 202, bubble base layer 218, and bubble layer 226, where the metal layer faces the environment outside the bag, the bubble layer faces the interior of the bag, and one side of the strengthening material layer 202 contacts the barrier layer substrate 222, and the other contacts the bubble cap layer 218.

Figure 8:
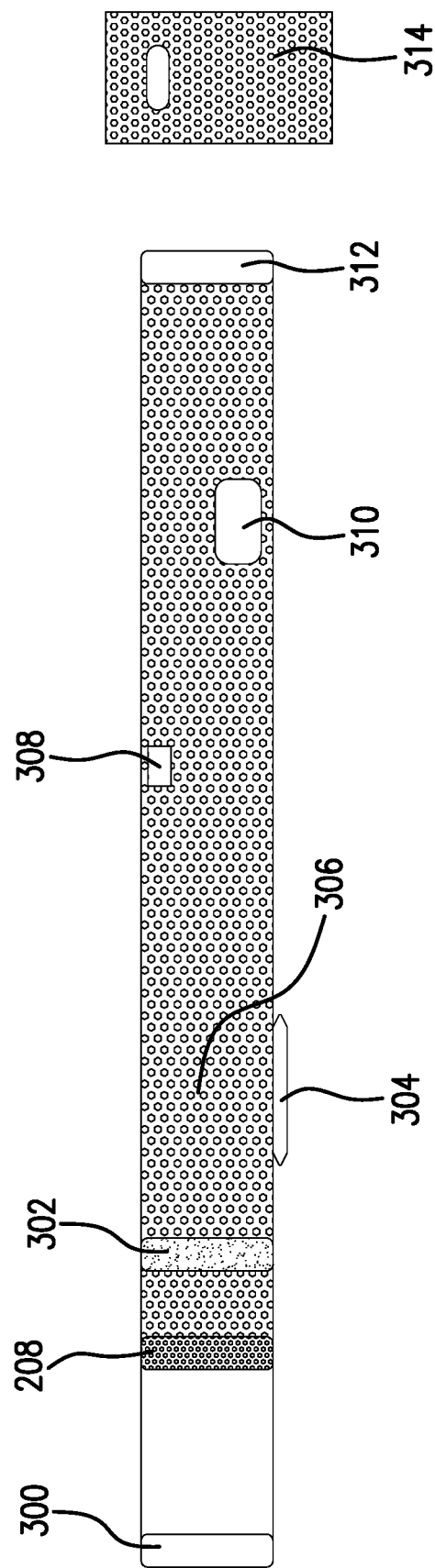
FIG. 8 is a top view of a sequential manufacturing process for an insulating carrying bag.

Referring now to FIG. 8, shown is a top view of a manufacturing process for producing an insulating carrying bag that demonstrates a more efficient process where roll forms of combined insulation material are not used during the bag converting process. Thermoplastic film unwinding step 300 is followed by processing in roller assembly 208 followed by a vapor barrier unwinding step 302. Following the vapor barrier unwinding step 302 the thermoplastic insulating layer is combined with the vapor barrier film from step 302 yielding multiple layers of insulation material 306. Then, the bottom sealing step 304 is applied to top and bottom layers of the combined material. An aperture hole punch step 308 follows and then a gusset forming unit 310 applies the gusset to a folded layer of the combined material 306. Finally, the side seal and top seal cuts are made in step 312. Finished bag 314 results from the process. The steps described in this process can be applied with any orientation of the finished bag product, with one or more bags being manufactured at a time and with the described steps being performed in any order.

Referring now to FIG. 9, shown is a front view of an insulating carrying bag 100 that is folded flat, so that gussets 38 extend down. Bag 100 contains first panel 102, first panel top free edge 10, first panel first side edge 14 and first panel second side edge 16

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

We claim:

1. An insulated carrying bag comprising:
   a. a multilayer first panel comprising a top free edge, a bottom edge, a first side edge a second side edge, a strengthened section comprising strengthening material, and a hand hole positioned in the strengthened section;
   b. a multilayer second panel comprising a top free edge, a bottom edge, a first side edge and a second side edge, a strengthened section comprising strengthening material, and a hand hole positioned in the strengthened section; and
   c. a multilayer bottom panel comprising a front edge and a back edge,
      the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges,
      wherein the connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material selected from low density polyethylene film having a density of 0.910 g/cc to 0.925 g/cc, wherein the layer of the strengthening material is positioned between the thermoplastic insulating layer and the vapor barrier layer.

2. The carrying bag of claim 1 further comprising a sealing device.

3. The carrying bag of claim 2 where the sealing device is positioned below the hand hole of the first and second panel.

4. The carry bag of claim 2 where the sealing device is selected from an adhesive strip, a press-seal closure or a slide lock closure.

5. The carrying bag of claim 1 wherein the vapor barrier layer is selected from a metalized polyester attached to a polyethylene film, a metalized polyethylene film, a multilayer polyethylene film, an aluminum oxide containing film structure, a silicon oxide containing film structure, an ethylene vinyl alcohol film structure, a linear low density polyethylene film, a polypropylene containing film structure, a high density polyethylene containing film structure, a metalized polyethylene film, or a nylon containing polyethylene film.

6. The carrying bag of claim 5 wherein the vapor barrier layer is selected from the metalized polyester attached to the polyethylene film or the metalized polyethylene film.

7. The insulated carrying bag of claim 5 wherein the vapor barrier layer is a metallized polyester layer.

8. The insulated carrying bag of claim 1 wherein the vapor barrier layer comprises a barrier base layer and a metal layer attached to the barrier base layer.

9. The insulated carrying bag of claim 1 wherein the layer of strengthening material has a thickness of 1.0 to 6.0 mil.

10. The insulated carrying bag of claim 9 wherein the thickness is from 1.5 to 3.0 mil.

11. The insulated carrying bag of claim 10 wherein the thickness is from 2.0 to 3.0 mil.

12. An insulated carrying bag comprising:
   a. a multilayer first panel comprising a top free edge, a bottom edge, a first side edge a second side edge, a strengthened section comprising strengthening material, and a hand hole positioned in the strengthened section;
   b. a multilayer second panel comprising a top free edge, a bottom edge, a first side edge and a second side edge, a strengthened section comprising strengthening material, and a hand hole positioned in the strengthened section;
   c. a multilayer bottom panel comprising a front edge and a back edge, and
   d. a tamper-evident sealing device,
      the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges,
      wherein the connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material selected from low density polyethylene film having a density of 0.910 g/cc to 0.925 g/cc, wherein the layer of the strengthening material is positioned between the thermoplastic insulating layer and the vapor barrier layer.

13. The insulated carrying bag of claim 12 wherein the tamper evident sealing device is positioned below the hand hole of the first and second panel.

14. An insulated carrying bag comprising:
   a. a multilayer first panel comprising a top free edge, a bottom edge, a first side edge a second side edge, a strengthened section comprising strengthening material, and a hand hole positioned in the strengthened section;
   b. a multilayer second panel comprising a top free edge, a bottom edge, a first side edge and a second side edge, a strengthened section comprising strengthening material, and a hand hole positioned in the strengthened section;
   c. a multilayer bottom panel comprising a front edge and a back edge, and
   d. a venting device connected to the first or second panel,
      the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges,
      wherein the connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material selected from low density polyethylene film having a density of 0.910 g/cc to 0.925 g/cc, wherein the layer of the strengthening material is positioned between the thermoplastic insulating layer and the vapor barrier layer.

15. The insulated carrying bag of claim 14 wherein the venting device is connected to the sealing device.

16. An insulated carrying bag comprising:
   a. a multilayer first panel comprising a top free edge, a bottom edge, a first side edge a second side edge, a strengthened section comprising strengthening material, and a hand hole positioned in the strengthened section;
   b. a multilayer second panel comprising a top free edge, a bottom edge, a first side edge and a second side edge, a strengthened section comprising strengthening material, and a hand hole positioned in the strengthened section; and
   c. a multilayer bottom panel comprising a front edge and a back edge,
      the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges,
      wherein the connected first panel, second panel and bottom panel form a compartment accessible through the top free edges of the first and second panels, and the layers of the first panel, second panel and bottom panel comprise an insulating thermoplastic layer and a vapor barrier layer selected from a metalized polyester attached to a polyethylene film, a metalized polyethylene film, a multi-layer polyethylene film, an aluminum oxide containing film structure, a silicon oxide containing film structure, an ethylene vinyl alcohol film structure, a linear low density polyethylene film, a polypropylene containing film structure, a high density polyethylene containing film structure, a metalized polyethylene film, or a nylon containing polyethylene film, and the first and second panels additionally comprise a layer of the strengthening material selected from low density polyethylene film having a density of 0.910 g/cc to 0.925 g/cc, wherein the layer of the strengthening material is positioned between the thermoplastic insulating layer and the vapor barrier layer.

17. The insulated carrying bag according to claim 16 wherein the vapor barrier layer is selected from a metalized polyethylene film, a multi-layer polyethylene film, an ethylene vinyl alcohol film structure, a linear low density polyethylene film or a polypropylene containing film structure.

18. A process for producing an insulated carrying bag comprising:
- a multilayer first panel comprising a top free edge, a bottom edge, a first side edge a second side edge, a first strengthened section comprising strengthening material, and a hand hole positioned in the strengthened section;
- a multilayer second panel comprising a top free edge, a bottom edge, a first side edge and a second side edge, a second strengthened section comprising strengthening material, and a hand hole positioned in the strengthened section; and
- a multilayer bottom panel comprising a front edge and a back edge,
  - the first panel first side edge being connected to the second panel first side edge along the two edges, the first panel second side edge being connected to the second panel second side edge along the two edges, the first panel bottom edge being connected to the front edge of the bottom panel along the edges, and the second panel bottom edge being connected to the back edge along the edges,
  - wherein the connected first panel, second panel and bottom panel form a compartment accessible through the top free edges of the first and second panels, and the layers of the first panel, second panel and bottom panel comprise an insulating thermoplastic layer and a vapor barrier layer, and the first and second panels additionally comprise a layer of the strengthening material selected from low density polyethylene film having a density of 0.910 g/cc to 0.925 g/cc, wherein the layer of the strengthening material is positioned between the thermoplastic insulating layer and the vapor barrier layer, the process comprising:
(a) feeding the multilayer first panel, multilayer second panel and multilayer bottom panel to an assembly device;
(b) folding the multilayer bottom panel material;
(c) inserting the folded multilayer bottom panel material between the multilayer first panel material and the multilayer second panel material;
(d) sealing and cutting the product of step (c) to form the insulated carrying bag.

19. The process of claim 18 wherein the films of the first panel material, second panel material and bottom panel material are fed from separate rolls.

* * * * *